US006761753B2

(12) United States Patent
Kishkovich et al.

(10) Patent No.: US 6,761,753 B2
(45) Date of Patent: Jul. 13, 2004

(54) METHODS USING FILTERS EMPLOYING BOTH ACIDIC POLYMERS AND PHYSICAL-ADSORPTION MEDIA

(75) Inventors: Oleg P. Kishkovich, Greenville, RI (US); Devon Kinkead, Holliston, MA (US); Anatoly Grayfer, Newton, MA (US); William M. Goodwin, Medway, MA (US); David Ruede, Northbridge, MA (US)

(73) Assignee: Extraction Systems, Inc., Franklin, MA (US)

(*) Notice: Subject to any disclaimer, the term of this patent is extended or adjusted under 35 U.S.C. 154(b) by 0 days.

(21) Appl. No.: 10/205,703

(22) Filed: Jul. 26, 2002

(65) Prior Publication Data

US 2002/0178923 A1 Dec. 5, 2002

Related U.S. Application Data

(62) Division of application No. 09/848,955, filed on May 4, 2001.
(60) Provisional application No. 60/201,928, filed on May 5, 2000, and provisional application No. 60/225,248, filed on Aug. 15, 2000.

(51) Int. Cl.[7] .......................... B01D 53/04; B01D 53/82
(52) U.S. Cl. .............................. 95/90; 95/115; 95/901
(58) Field of Search ............................ 95/90, 114, 115, 95/141, 285, 286, 288, 901, 8; 96/134, 135, 413; 423/210

(56) References Cited

U.S. PATENT DOCUMENTS

| | | | |
|---|---|---|---|
| 3,019,127 A | 1/1962 | Czerwonka et al. | ........... 117/33 |
| 3,409,691 A | 11/1968 | Small | ......................... 260/676 |
| 3,607,706 A | 9/1971 | Eisenmann et al. | .......... 204/296 |
| 3,998,988 A | 12/1976 | Shimomai et al. | ........... 428/400 |
| RE29,410 E | 9/1977 | Yoshino | ................. 427/390 R |
| 4,055,075 A | * 10/1977 | Allan et al. | .................... 73/40.7 |
| 4,072,793 A | 2/1978 | Watanabe et al. | ............ 428/255 |
| 4,204,011 A | 5/1980 | Tanabe et al. | .................. 427/57 |
| 4,224,415 A | 9/1980 | Meitzner et al. | ............... 521/38 |
| 4,313,832 A | 2/1982 | Shimizu et al. | ............... 210/663 |
| 4,322,230 A | 3/1982 | Schoen et al. | ................ 55/316 |
| 4,629,479 A | 12/1986 | Cantoni | ........................ 55/274 |
| 4,852,133 A | 7/1989 | Ikeda et al. | .................... 378/34 |
| 4,981,501 A | 1/1991 | Von Blucher et al. | ......... 55/316 |

(List continued on next page.)

FOREIGN PATENT DOCUMENTS

| | | |
|---|---|---|
| DE | 4413606 A1 | * 11/1995 |
| DE | 19859788 | 3/2000 |
| EP | 00335034 | 10/1989 |
| EP | 0398847 | 11/1990 |
| EP | 0584030 | 2/1994 |
| JP | WO 00/07696 | 2/2000 |
| WO | WO 00/25896 | 5/2000 |

OTHER PUBLICATIONS

Kishkovich, O., et al., "An Accelerated Testing Technique for Evaluating Performance of Chemical Air Filters for DUV Photolithographic Equipment," SPIE vol. 3677, pp. 857–865 (Part of the SPIE Conference on Metrology, Inspection and Process Control for Microlighography XIII, Santa Clara, CA) (Mar. 1999).

Primary Examiner—Frank M. Lawrence
(74) Attorney, Agent, or Firm—Bowditch & Dewey, LLP

(57) ABSTRACT

A filter includes at least two different adsorptive media. First, chemisorptive media, which is porous and includes an acidic functional group, is used to remove molecular bases, including ammonia, organic amines, imides and aminoalcohols, from the atmosphere used in semiconductor fabrication and other processes that require uncontaminated gaseous environments of high quality. Second, physisorptive media is able to adsorb condensable contaminants, particularly those having a boiling point greater than 150 degrees C. The physisorptive media can include untreated, activated carbon.

20 Claims, 14 Drawing Sheets

U.S. PATENT DOCUMENTS

| | | | |
|---|---|---|---|
| 5,039,321 A | 8/1991 | Satoh et al. | 454/187 |
| 5,133,864 A | 7/1992 | Vaughn et al. | 210/437 |
| 5,166,530 A | 11/1992 | McCleary | 250/492.2 |
| 5,204,055 A | 4/1993 | Sachs et al. | 419/2 |
| 5,290,345 A | 3/1994 | Osendorf et al. | 96/129 |
| 5,300,604 A | 4/1994 | Nasman et al. | 526/278 |
| 5,306,321 A | 4/1994 | Osendorf | 55/487 |
| 5,328,758 A | 7/1994 | Markell et al. | 428/281 |
| 5,340,656 A | 8/1994 | Sachs et al. | 428/546 |
| 5,387,380 A | 2/1995 | Cima et al. | 264/69 |
| 5,399,377 A | 3/1995 | Economy et al. | 427/226 |
| 5,430,303 A | 7/1995 | Matsumoto et al. | 250/492.22 |
| 5,462,485 A | 10/1995 | Kinkead | 454/256 |
| 5,486,410 A | 1/1996 | Groeger et al. | 428/283 |
| 5,582,865 A | 12/1996 | Rezuke et al. | 427/244 |
| 5,605,746 A | 2/1997 | Groeger et al. | 442/347 |
| 5,607,647 A | 3/1997 | Kinkead | 422/122 |
| 5,616,169 A | 4/1997 | De Ruiter et al. | 95/90 |
| 5,626,820 A | 5/1997 | Kinkead et al. | 422/122 |
| 5,647,356 A | 7/1997 | Osendorf et al. | 128/206.17 |
| 5,685,895 A | 11/1997 | Hagiwara et al. | 96/117 |
| 5,743,927 A | 4/1998 | Osendorf | 55/497 |
| 5,753,345 A | 5/1998 | Kuma et al. | 428/143 |
| 5,772,738 A * | 6/1998 | Muraoka | 96/129 |
| 5,772,884 A | 6/1998 | Tanaka et al. | 210/500.36 |
| 5,783,608 A | 7/1998 | Sugo et al. | 521/29 |
| 5,807,424 A | 9/1998 | De Ruiter et al. | 95/148 |
| 5,833,726 A | 11/1998 | Kinkead et al. | 55/356 |
| 5,834,114 A | 11/1998 | Economy et al. | 428/368 |
| 5,856,198 A | 1/1999 | Joffe et al. | 436/100 |
| 5,890,367 A | 4/1999 | You et al. | 454/187 |
| 5,906,429 A | 5/1999 | Mori et al. | 362/293 |
| 5,944,878 A | 8/1999 | Lindhe | 96/132 |
| 6,056,805 A | 5/2000 | Litwin et al. | 95/143 |
| 6,162,281 A * | 12/2000 | Ammann et al. | 95/8 |
| 6,228,135 B1 * | 5/2001 | Sugo et al. | 55/528 |
| 6,352,579 B1 | 3/2002 | Hirata et al. | 96/134 |
| 6,398,846 B1 * | 6/2002 | Lorimer et al. | 95/14 |
| 6,447,584 B1 | 9/2002 | Kishkovich et al. | |

\* cited by examiner

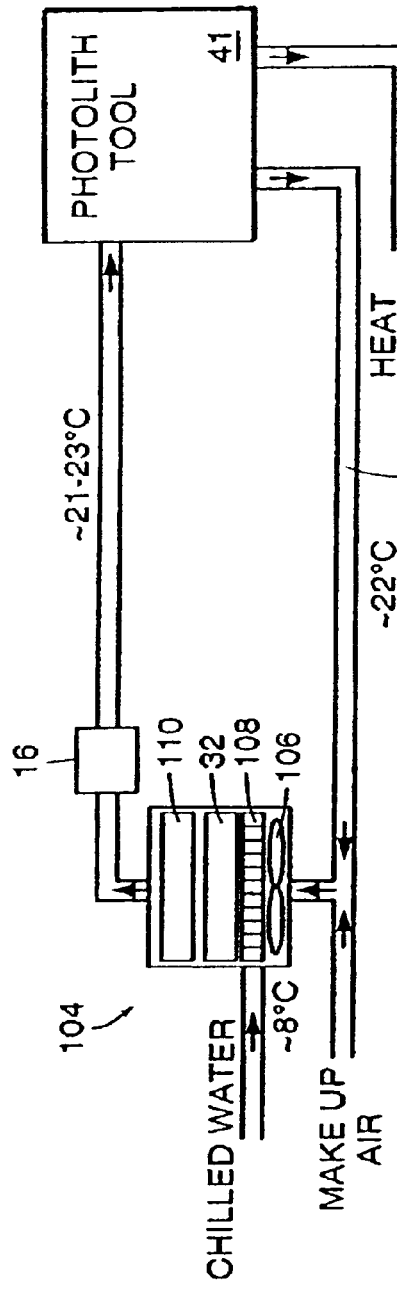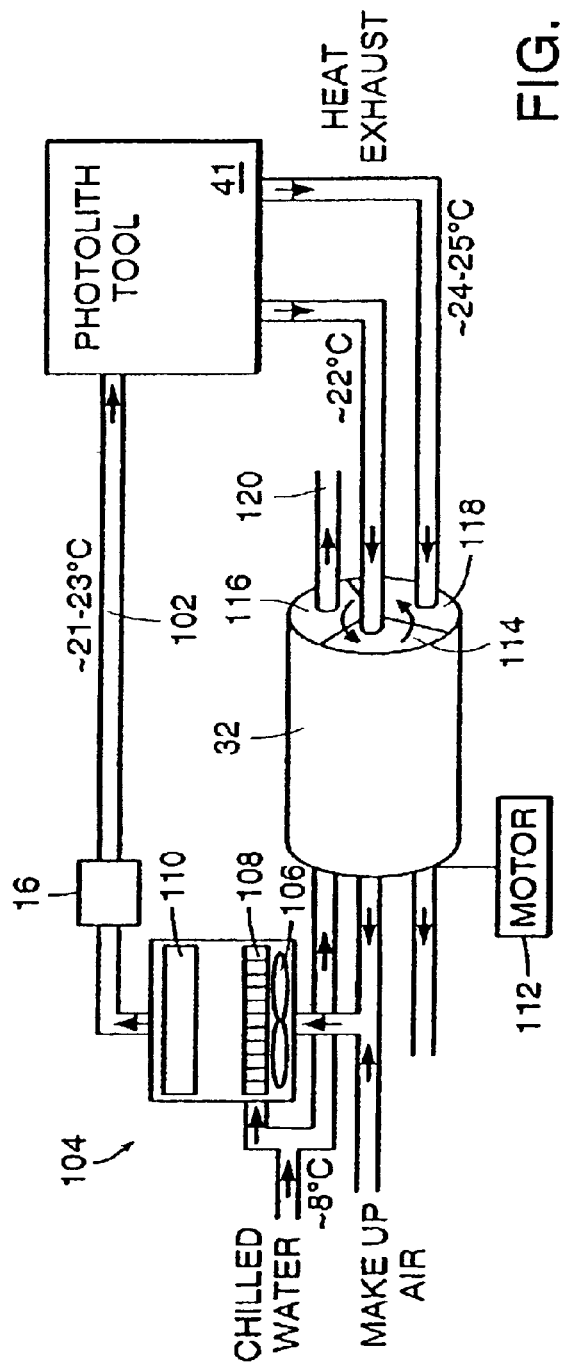

METHODS USING FILTERS EMPLOYING BOTH ACIDIC POLYMERS AND PHYSICAL-ADSORPTION MEDIA

CROSS REFERENCES TO RELATED APPLICATIONS

This application is a divisional patent application of U.S. patent application Ser. No. 09/848,955, filed on May 4, 2001, which claims the benefit of U.S. Provisional Application No. 60/201,928, filed on May 5, 2000, and U.S. Provisional Application No. 60/225,248, filed on Aug. 15, 2000. The entire contents of the above applications are incorporated herein by reference in entirety.

BACKGROUND OF THE INVENTION

In this age of increased air pollution, the removal of chemicals from the air we breathe is a concern of everyone. In addition, in the fabrication of electronic materials and of devices such as semiconductors, there is a requirement for uncontaminated air of high quality. To filter contaminants from the air, gas phase filtration is commonly employed, typically using activated carbon manufactured in various ways. One approach uses a carbon/adhesive slurry to glue the carbon to the substrate. The adhesive decreases carbon performance by forming a film on its surface. In another approach, an organic-based web is carbonized by heating, followed by carbon activation. Filters produced by such an approach is expensive and has relatively low adsorption capacity. In yet another approach, a slurry of carbon powders and fibers is formed into sheets by a process analogous to a wet papermaking process. This material has a medium-to-high cost, and has an undesirable high pressure drop. Moreover, chemically-impregnated carbon particles, used for the chemisorption of lower molecular weight materials, cannot be efficiently used in conjunction with an aqueous process, as the aqueous nature of the process either washes away the chemical used to impregnate the carbon, or reacts undesirably with the impregnating or active chemical groups thereby rendering it inoperative. In general, however, filter materials that do not incorporate chemically-active groups perform far less effectively for some key low-molecular-weight components, such as ammonia, in comparison to filter materials that include chemically-active groups.

SUMMARY OF THE INVENTION

Such filters have been accepted in the industry, and they are presumably considered to perform adequately for their intended purpose. However, they are not without their shortcomings. In particular, none of these aforementioned prior art approaches fully achieve the desired properties that provide a clean, cost effective, high efficiency, low pressure drop, adsorptive composite.

The present invention provides a filter which overcomes these shortcomings. In particular, in one aspect of the invention, a fluid-permeable filter includes a conduit through which fluid, particularly gas, can flow. Within the conduit is chemisorptive media that includes a copolymer having an acidic functional group for chemically adsorbing a base contaminant in a fluid passing through the conduit. Also within the conduit is physisorptive media for physically adsorbing a condensable contaminant from a fluid passing through the conduit. The chemisorptive media and physisorptive media are in separate filter elements in a preferred embodiment, though the two media types can alternatively be intermixed to form a single, undivided filter body.

Preferably, the filter is a clean, cost-effective, high-efficiency, low-pressure-drop, gas phase filter comprising a high-surface-area, highly-acidic, chemically-acidic adsorbent in combination with untreated, or virgin, activated carbon. One embodiment of the invention employs a non-woven composite material having acidic functional groups that bind to airborne bases. The untreated, activated carbon adsorbs organic and inorganic condensable contaminants, typically those having a boiling point greater than 150° C. The invention can be used in lithography systems that employ materials that are sensitive to impurities, such as molecular bases (e.g., ammonia and n-methyl pyrrolididnone), and organic and inorganic condensable contaminants (e.g., iodobenzenes and siloxanes), present in the air circulating through semiconductor wafer processing equipment. A large number of bases including ammonia, NMP, triethylamine pyridine, and others, can be maintained at concentrations below 2 ppb in a tool cluster filtered with the present invention. The acidic adsorbent can be formed, for example, by the dry application of an active, acidic adsorbent to a non-woven carrier material that is then heated and calendered with cover sheets.

The non-woven carrier materials can be polyester non-wovens, and the acidic adsorbent can include sulfonated divinyl benzene styrene copolymer. One embodiment employs carboxylic functional groups. The acidic groups have at least 1 milliequivalent/gram of copolymer acidity level or higher and preferably at least 4.0 milliequivalents/gram of copolymer or higher. The polymers used are porous, and can have a pore size in the range of 50–400 angstroms and a surface area of 20 $m^2/g$ or higher.

The dry processing of a non-woven polyester batting allows for even distribution of acidic, adsorbent particles throughout the depth of the polyester batting. This provides an increased bed depth at a very low pressure drop, which is highly desirable since a twofold increase in bed depth can increase the filter's breakthrough time (time to failure) fourfold when using these thin fabric-based sulfonic beds.

Activated carbon is discussed in greater detail in U.S. Pat. No. 5,582,865, titled, "Non-Woven Filter Composite." The entire contents of this patent are incorporated herein by reference. The filter can have two (or more) layers, one of activated carbon and one of sulfonated divinyl benzene styrene copolymer beads. Additionally, two or more materials can be mixed to provide a composite filter.

Thus, provided herein is a clean, cost-effective, high-efficiency, low-pressure-drop, adsorptive composite filter, and a method for forming said composite filter. The composite filter is particularly useful for the removal of base and organic and inorganic condensable contaminants (typically those with a boiling point greater than 150 degrees C) in an air stream. Particulates will also be removed if greater than the pore size of the filter. The filter can have a service life of several months with a pressure drop to reduce power consumption and minimize impact on the systems operation. For example, a high-pressure-drop filter can require a longer time for a lithography system to equilibrate the temperature and humidity after filter replacement. In comparison to chemically-treated, activated-carbon filters, the combination filters of this invention offer much higher adsorption performance due to the superior adsorption properties of untreated, activated carbon over chemically-treated, activated carbon. The use of untreated, activated carbon in accordance with methods described herein can provide superior breakthrough capacity for organic and inorganic condensable contaminants because the chemical treatment performed on the activated carbon to render it suitable for capturing molecular bases compromises its capacity for adsorbing organic and inorganic condensable contaminants, typically those with a boiling point greater than 150 degrees C.

In another embodiment, a synthetic carbon material, such as that described in U.S. Pat. No. 5,834,114, the contents of which are incorporated herein by reference in their entirety, can be coated with the acidic materials of the present invention to provide a porous acidic filter element in accordance with the invention. In yet another embodiment, the activated nutshell carbon media described in U.S. Pat. No. 6,033,573, the contents of which are incorporated by reference in their entirety, can be used alone or in combination with any of the other chemisorptive or physisorptive media described herein to remove contaminants from the air flowing through the conduit in the same manner as is taught in this specification.

A detection system and method of use for determining when the filter needs to be replaced by detecting base contaminants in air is described in U.S. patent application Ser. No. 09/232,199, entitled, "Detection of Base Contaminants in Gas Samples," filed on Jan. 14, 1999, now U.S. Pat. No. 6,207,460, issued on Mar. 27, 2001, with Oleg Kishkovich, et al. as inventors. Also, U.S. patent application Ser. No. 08/795,949, entitled, "System for Detecting Base Contaminants in Air", filed Feb. 28, 1997, now U.S. Pat. No. 6,096,267, issued on Aug. 1, 2000, with Oleg Kishkovich, et al. as inventors, and U.S. patent application Ser. No. 08/996,790, entitled, "Protection of Semiconductor Fabrication and Similar Sensitive Processes," filed Dec. 23, 1997, now U.S. Pat. No. 6,296,806, issued on Oct. 2, 2001, with Oleg Kishkovich, et al. as inventors, can also be used with the present invention. These patent applications disclose the protection of a DUV lithography processes using chemically-amplified photoresists that are sensitive to amines in the air. These patent applications are incorporated in the present application in their entirety by reference.

One method of fabricating a filter element having a large surface area and the desired flow characteristics involves the use of a powdered material that is deposited in sequential layers one on top of the other. Following the deposit of each layer of powdered material, a binder material is delivered onto each layer of powdered material using a printing technique in accordance with a computer model of the three dimensional filter element being formed. Following the sequential application of all of the required powder layers and binder material to form the part in question, the unbound powder is appropriately removed, resulting in the formation of the desired three dimensional filter element. This technique provides for the fabrication of complex unitary or composite filter elements having high surface area that are formed with a very high degree of resolution.

In another apparatus, the physisorptive and chemisorptive filter media are positioned in a circulation loop for circulating air through a photolithography tool. The two media are respectively positioned at different locations such that the physisorptive media will be maintained at a temperature cooler than that at which the chemisorptive media is maintained.

The physisorptive media can be positioned upstream from the chemisorptive media (i.e., between the chemisorptive media and an outlet of the photolithography tool) and can be positioned proximate to the downstream side of a cooling coil in the air conditioning unit of the tool. Alternatively, the physisorptive media can be coupled with a separate cooling element, such as a source of chilled water. In either case, the air passing through the physisorptive media can be cooled and then, after exiting the physisorptive media, reheated to a fixed temperature and passed through the chemisorptive media before re-entering the photolithography tool. Temperature sensors can be used to monitor the temperature of the different media and also provide feedback signals to a controller for closed loop control of the system. The physisorptive filter element can also be contained in a rotating wheel with separate chambers for active adsorption, regeneration and conditioning. Advantages provided by some of these embodiments include enhanced removal of lower-molecular-weight condensable contaminants, reduction in the overall footprint of the system, reduction in operating pressure drop of the filtration component, and significantly increased time between change-out or service. Further, lower-molecular-weight organic contaminants may be removed more effectively with the temperature-swing beds described herein than is achievable with passive adsorption beds.

In another aspect of the invention, a filter unit include a multiplicity of filter elements. The filter elements are made of a chemisorptive media and a physisorptive media. The filter unit also includes a multiplicity of sampling ports within the filter unit for connecting to a monitor device which monitors the performance of the filter elements. The sampling ports are arranged in a manner with individual sampling ports located between adjacent filter elements. There can be sampling port located on an upstream side of the multiplicity of filter elements, and another sampling port located on a downstream side of the multiplicity of filter elements.

In some embodiments, the monitor device is an analytical device, such as, for example, a gas chromatograph mass selective detector, an ion mobility spectrometer, an acoustic wave detector, an atomic absorption detector, an inductance couple plasma detector, or a Fourier transform methods. Alternatively, the monitor device can be a concentrator which collects the sample drawn to the concentrator with a pump, or the concentrator is coupled to the sample port so that the contaminants accumulate in the concentrator by diffusion. Once the sample is collected in the concentrator, the concentrator is taken to a lab for evaluating the sample. The filter elements can be arranged in a set of stack which are arranged in a series, and in each stack, the filter elements are arranged in parallel.

In another aspect, a photolithography system includes an air handler for moving air through the system, and delivers unfiltered air to the filter unit, and a photolithography tool which receives filtered air from the filter unit. A particular advantage of this arrangement is that it is able to detect contaminants before the contaminants reach the lens of a photolithography tool.

In yet another aspect of the invention, a filter unit includes one or more filter elements. There can be a sampling port located between two filter elements. Additionally, or alternatively, there is a sampling port located on one side of a filter element, or there can be a second sampling port located on an opposite side of the filter element.

Related aspects of the invention include a method for filtering air through a filter unit and a method for circulating air through a photolithography tool.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a schematic illustration of an apparatus including a photolithography tool and a circulation loop with physisorptive media and chemisorptive media positioned for enhanced contaminant removal efficiency.

FIG. 7 is a schematic illustration of another embodiment of an apparatus including a photolithography tool and a circulation loop with physisorptive media and chemisorptive media positioned for enhanced contaminant removal efficiency.

DETAILED DESCRIPTION OF THE INVENTION

Figure 2:
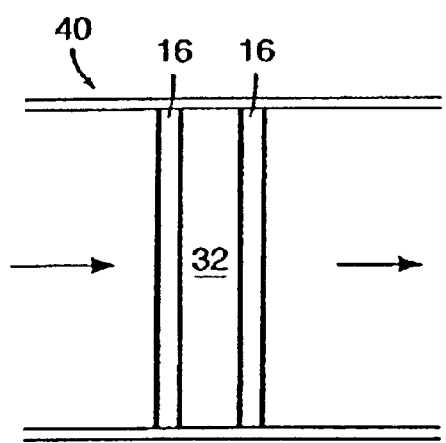
FIG. 2 illustrates a filter, wherein the chemisorptive filter element is coated on the physisorptive filter element.
Figure 3:
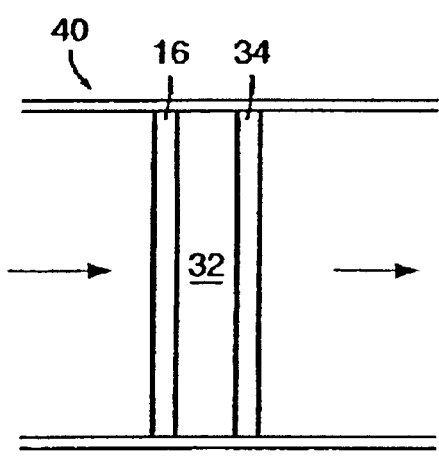
FIG. 3 illustrates a filter including an electrostatically-charged nonwoven filter material in addition to the chemisorptive filter element and physisorptive filter element.

A description of preferred embodiments of the invention follows. A fluid-permeable filter includes chemisorptive media and physisorptive media. Each of these two types of media can be in separate filter elements. The embodiment illustrated in FIG. 1 includes a chemisorptive filter element 16 and a physisorptive filter element 32 mounted within a conduit 36. In an alternative embodiment, illustrated in FIG. 2, the chemisorptive filter element 16 can form a layer attached to one or both sides of the physisorptive filter element 32. Additionally, an electrostatically-charged nonwoven filter material 34 can cover the chemisorptive and physisorptive filter elements 16, 32, as shown in FIG. 3.

The chemisorptive filter element 16 includes porous, chemisorptive media formed with a copolymer having an acidic functional group that enables the group to react with a reagent. The physisorptive filter element 32 includes physisorptive media, such as untreated, activated carbon. The term, "untreated," as used herein, means an activated carbon that has not been modified by chemical treatment to perform chemisorption; rather, untreated, active carbon remains as a physical, or nonpolar, adsorbent. The physisorptive media remove organic and inorganic condensable contaminants, typically those having a boiling point greater than 150 degrees C. via physisorption, while the chemisorptive media remove base vapors via chemisorption. The term, "physisorption," refers to a reversible adsorption process in which the adsorbate is held by weak physical forces. In contrast, the term, "chemisorption," refers to an irreversible chemical reaction process in which chemical bonds are formed between gas or liquid molecules and a solid surface.

Figure 4:
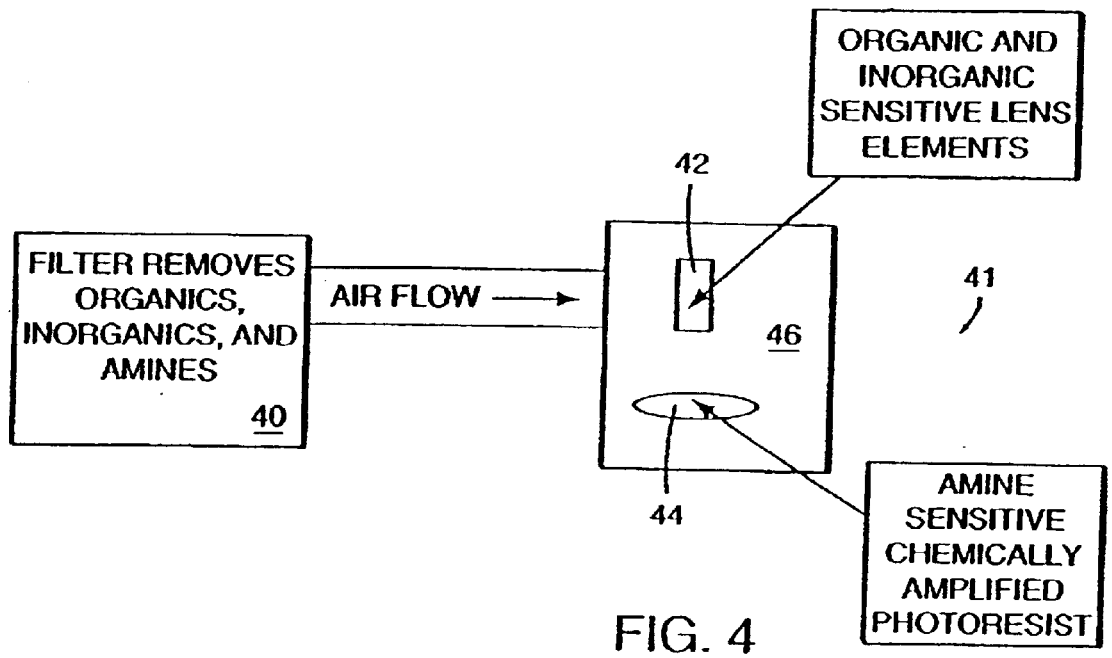
FIG. 4 illustrates a filter of this invention coupled with a photolithography tool.

As shown in FIG. 4, the filter 40 can be mounted at an inlet of a deep ultraviolet photolithography tool 41 (e.g., a stepper or scanner) to filter air entering the tool 41 and to protect the projection and illumination optics 42 as well as the photoresist on a wafer 44 within the chamber 46 of the photolithography tool 41.

Figure 5:
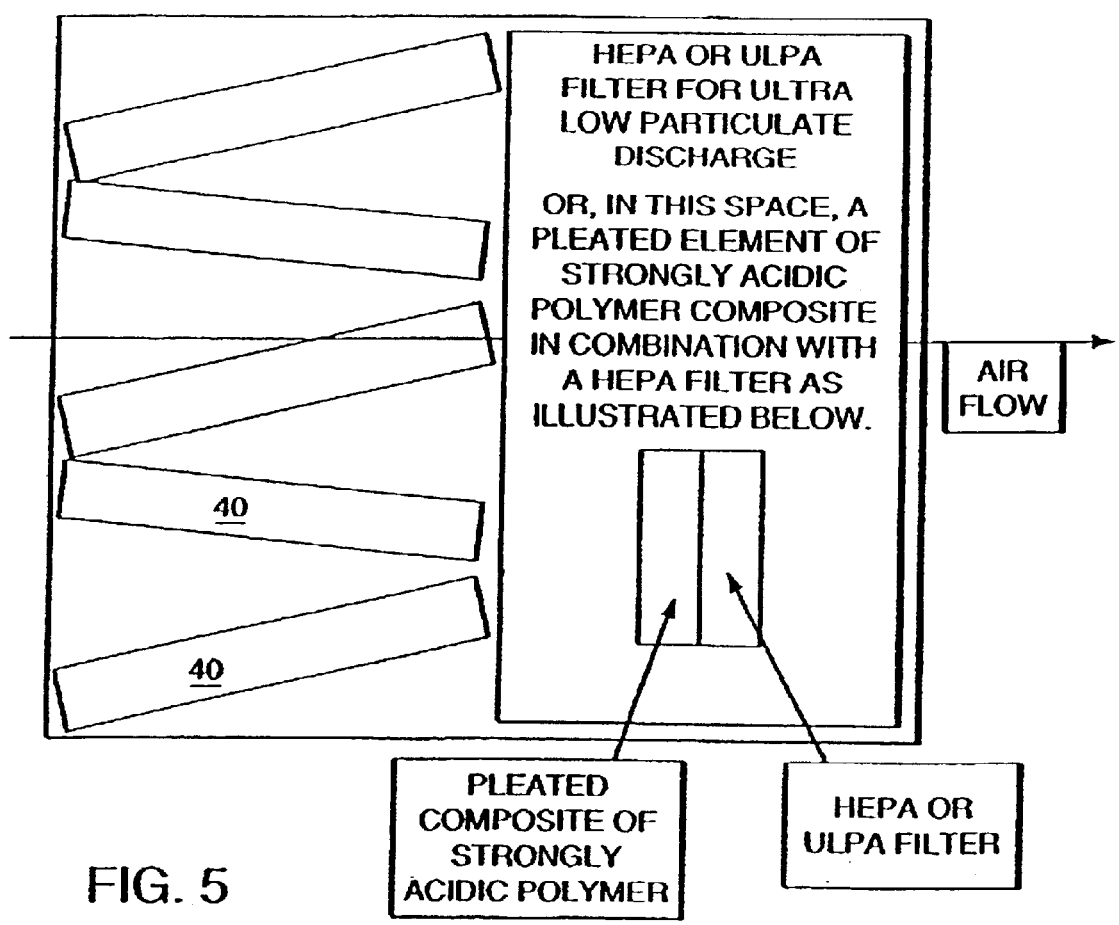
FIG. 5 illustrates a filter assembly.

The filter can have a variety of constructions. In a first example, a bed of polymer pellets and untreated, activated carbon is exposed to the airstream using a traditional media tray and rack system (e.g., a metal enclosure that uses perforated material or screens both to hold in the adsorbent while allowing air to flow through the structure). In a second example, the filter is in the form of a honeycomb configuration where polymer pellets and untreated, activated carbon are held in a partially-filled or completely-filled honeycomb structure. In a third example, the polymer and untreated, activated carbon form a monolithic porous or honeycomb structure. In a fourth example, a mat of polymer fibers, either woven or nonwoven, incorporate untreated, activated carbon and are pleated and arranged into a traditional pleated air filter. In a fifth example, a bed of activated carbon pellets are exposed to the airstream using a traditional media tray and rack system with a layer of nonwoven composite material comprising acidic polymer, comprising a sulfonated copolymer-based composite material attached or incorporated into one side or both sides of the carbon tray. A pleated array of filters are illustrated in FIG. 5.

The apparatus illustrated in FIGS. 6 and 7 are designed to remove lower-boiling-point contaminants with greater effectiveness and to better optimize the separate conditions under which the chemisorptive media and physisorptive media operate. By providing better purification of the airstream entering a photolithography tool, better protection is provided against photoresist contamination from airborne molecular bases and photo-induced organic contamination of optics surfaces.

In the apparatus of FIG. 6, a circulation loop 102 circulates air through the photolithography tool 41. An air conditioning unit 104 regulates the temperature and humidity of air entering the photolithography tool 41 and ensures that the temperature and humidity remain within tightly-prescribed limits. A computer having a computer-readable medium storing software code for controlling the cooling element (e.g., cooling coils) and heating element can be coupled via a processor with the air conditioning unit 104 to ensure that the temperature and humidity are maintained within those limits. A chemisorptive filter element 16 is positioned within the circulation loop to take advantage of the enhanced chemisorption that occurs at warmer and more humid conditions. Meanwhile, a physisorptive filter element 32 is positioned to take advantage of the enhanced physisorption that takes place under cooler and drier conditions The chemisorptive filter element 16 is positioned in the circulation loop 102 at a position downstream from the air conditioning unit 104 and physisorptive filter element 32. In this embodiment, the chemisorptive filter element will therefore be operated at the fixed temperature (e.g., in a range of about 21° to about 23° C.) and humidity established for air entering the photolithography tool 41. Maintaining this fixed temperature in the tool 41 is important to minimize temperature-induced lens distortions that can lead to aberations.

Air entering the air conditioning unit 104 comprises recirculated air that has exited the photolithography tool 41 with make-up air (provided to account for inevitable pressure losses) mixed in. In this embodiment, the air can be at about ambient pressure or at a lower pressure. A fan 106 is provided in the air conditioning unit 104 to drive the flow of air through the unit 104 and through the entire circulation loop 102. Cooling coils 108 are positioned downstream from the fan 106 to cool the incoming air. The cooling coils can be cooled by water chilled to about 8° C. After being cooled by the cooling coils 108, the air may be at a temperature of about 18° to about 20° C. In the embodiment of FIG. 6, the air then passes through physisorptive filter element 32, which is positioned next in line. Due to its positioning proximate to and downstream from the cooling coils 108, the physisorptive filter element 32 is operated at a reduced temperature at which adsorption is enhanced. Finally, the air passes through heating element 110, which reheats the air to the desired operating temperature before it is passed through chemisorptive filter element 16. Accordingly, the cooling coils 108 and heating element 110 of the air conditioning unit 104 are advantageously utilized to provide enhanced physisorption and chemisorption in addition to conditioning the temperature and humidity of the air for enhanced operation of the photolithography tool 41.

In the apparatus of FIG. 7, the physisorptive filter element 32 is in the form of a rotating wheel about 1 or 2 meters in length and having three separate chambers filled with physisorptive filter media. A motor 112 is couple with the wheel to rotationally drive it in the direction shown by the arrows (counter-clockwise when viewed from an upstream position in the circulation loop 102).

The chamber operating as the active chamber 114 is positioned to receive air recirculated from the phtolithography tool 41 through circulation loop 102. The active chamber 114 will remove contaminants from the air in the circulation loop 102.

The preceding chamber in rotational sequence is operating as the conditioning chamber 116. The conditioning chamber 116 is positioned to receive chilled water circulated through line 120. The chilled water cools the physisorptive filter media in conditioning chamber 116 so that the media will be cooled (providing enhanced adsorptive behavior) before rotation positions this chamber as the active chamber 114. Alternatively, other cooling elements such as supplemental cooling coils or a regenerative heat exchanger can be used cool the physisorptive filter media in the conditioning chamber 116. Other apparatus using adiabatic cooling of a compressed gas, which is then passed through the bed of physisorptive filter media can also be used.

The remaining chamber, which is operating as the regeneration chamber 118, is positioned to receive heat exhaust from the photolithography tool 41. The heat from the heat exhaust will raise the temperature of the physisorptive filter media in regeneration chamber 118 and thereby cause condensed contaminants to vaporize and release from the physisorptive filter media rendering the physisorptive filter media ready for reuse. The released contaminants can then be captured and recycled. As an alternative to the heat exhaust, other auxilliary sources of heat can be provided to desorb contaminants from the media.

With each one-third rotation, the chamber operating as the active chamber 114 becomes the regeneration chamber 118; the chamber operating as the regeneration chamber 118 becomes the conditioning chamber 116; and the chamber operating as the conditioning chamber 116 becomes the active chamber 114. This rotational cycle continues throughout operation of the tool to continually regenerate and cool the physisorptive filter media so that "fresh" media will always be available for use. As such, the beds of filter media are operated as "temperature swing adsorption beds," which, in combination with the chemisorptive filter media can maintain amine levels in the circulated air below 1 part per billion and can maintain contamination levels of other organics below 1 part per billion in an apparatus which also maintains temperature (via the air conditioning unit) within +/−17 mK.

This same wheel used as the physisorptive filter element 32 in FIG. 7 can likewise be used in the apparatus of FIG. 6. As an alternative to the rotating wheel embodiment of the physisorptive filter element 32, separate conduits can respectively branch from the circulation loop, heat exhaust, and chilled water conduit into each of the three chambers, and valving at each of the branches can be governed to rotate the flow from each conduit through each chamber.

The apparatus of FIGS. 6 and 7 are particularly useful when used to filter air for a stepper (exposure) tool in a photolithography apparatus, where the filter elements can remove contaminants that may form free radicals in the tool, which can then stick to the lens of the tool, thereby fouling its operation. Nevertheless, the apparatus of FIGS. 6 and 7 can also be used to filter air from a track (where organics can change the wettability of a wafer being processed and can throw off measurements of oxide layer thickness) or to filter air entering other elements in a photolithography apparatus that can be harmed by contaminants. Such uses, which can be combined with the use of the apparatus of FIGS. 6 and 7 are further described in U.S. Pat. No. 5,833,726, which is hereby incorporated by reference in its entirety.

Figure 8:
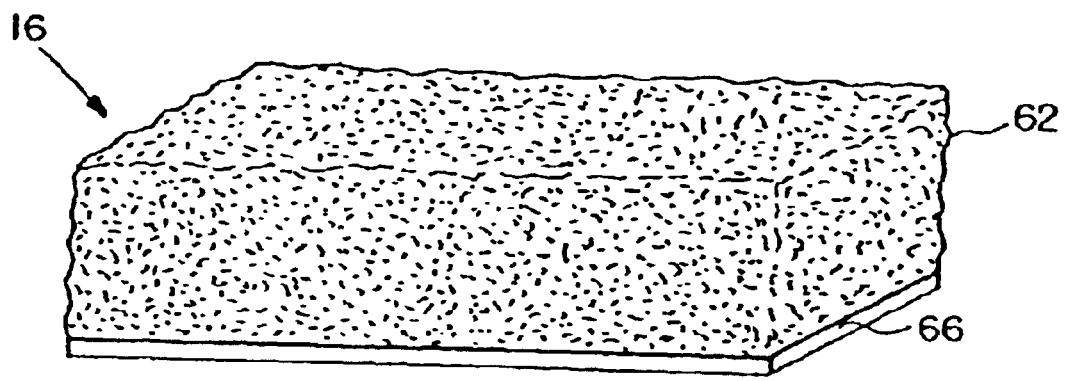
FIG. 8 is a perspective view of an acidic, adsorbent filter element before heating and calendaring.

Referring to FIG. 8, a portion of an acidic, chemisorptive composite filter element 16 is shown. The chemisorptive composite filter element 16 has a cover sheet 66 and a middle layer 62. The cover sheet 66 can be a polyester non-woven fabric having a binder-to-fiber ratio of 55/44 and a thickness of 0.024 inches. The middle layer 62 is an air-laid polyester non-woven fabric having a thickness of 0.25 inches and a binder to fiber ratio of 35% to 65%. The middle layer 62 is impregnated with a porous, acidic, polymer material that binds readily with molecular bases in air flowing through the filter. Alternatively, the fabrics can be woven.

Figure 9:
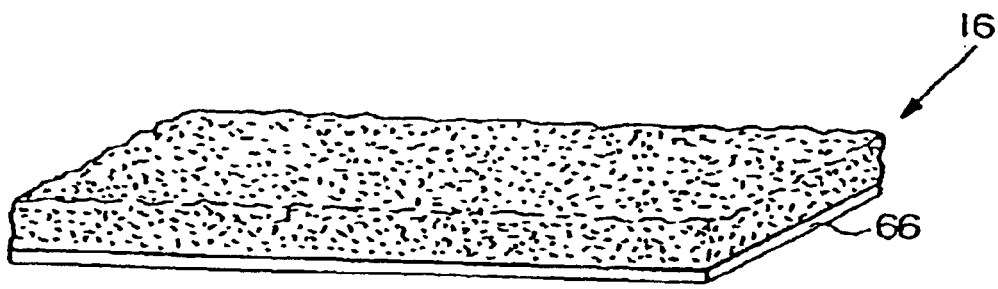
FIG. 9 is a perspective view of the acidic, adsorbent filter element after heating and calendaring.
Figure 10:
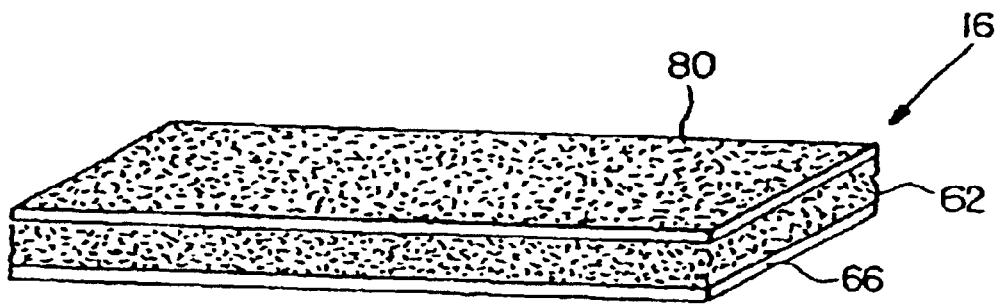
FIG. 10 is a perspective view of the acidic, adsorbent filter element after heating and calendaring with a cover sheet.

The structure of FIG. 9 can be used directly in this form as the acidic, adsorbent composite filter element. The acidic, adsorbent composite 16, can employ a second cover sheet 80, provided on the surface of middle layer 62, opposite to the first cover sheet 66, as shown in FIG. 10. The cover sheet 66/80 can be a filtering or non-filtering non-woven polyester, polyamide or polypropylene material or other similar materials. If the cover sheet 66/80 is a filtering material, it serves to provide some filtering of the air entering the composite structure for removal of particulate materials in the air stream. The cover sheet 66/80 can also serve to retain the porous acidic polymer material such as a sulfonated divinyl benzene styrene copolymer, which can be in bead form, within the middle layer or batting 62. The cover sheets 66/80 can also be chemically inert materials such as polypropylene or polyester.

Figure 1:
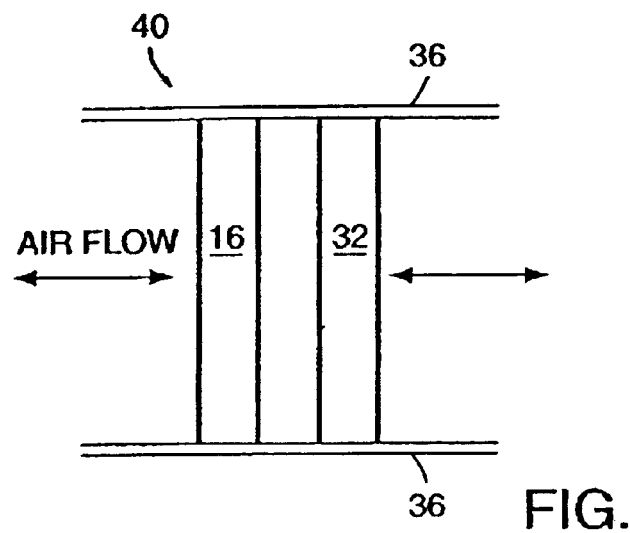
FIG. 1 illustrates a filter including a chemisorptive filter element and a physisorptive filter element.

The physisorptive filter element 32, shown in FIGS. 1, 6 and 7, can include untreated, activated carbon. The carbon is porous (the specific surface area can be on the order of 1000 $m^2/g$) and can be provided in the form of fibers. Alternatively, the untreated, activated carbon can be in the form of particles aggregated in a tray. In another embodiment, the untreated, activated carbon can be formed into a block and held together with a binder material. The untreated, activated carbon can be formed from a variety of sources, including coconut shell, coal, wood, pitch, and other organic sources. Further still, a sulfonated copolymer coating can be attached to the untreated, activated carbon.

Alternatively, high-surface-area filter elements of this invention can be fabricated using a three-dimensional printing technique as described in U.S. Pat. Nos. 5,204,055; 5,340,656; and 5,387,380, the entire contents of these patents being incorporated herein by reference in their entirety.

Figure 11:
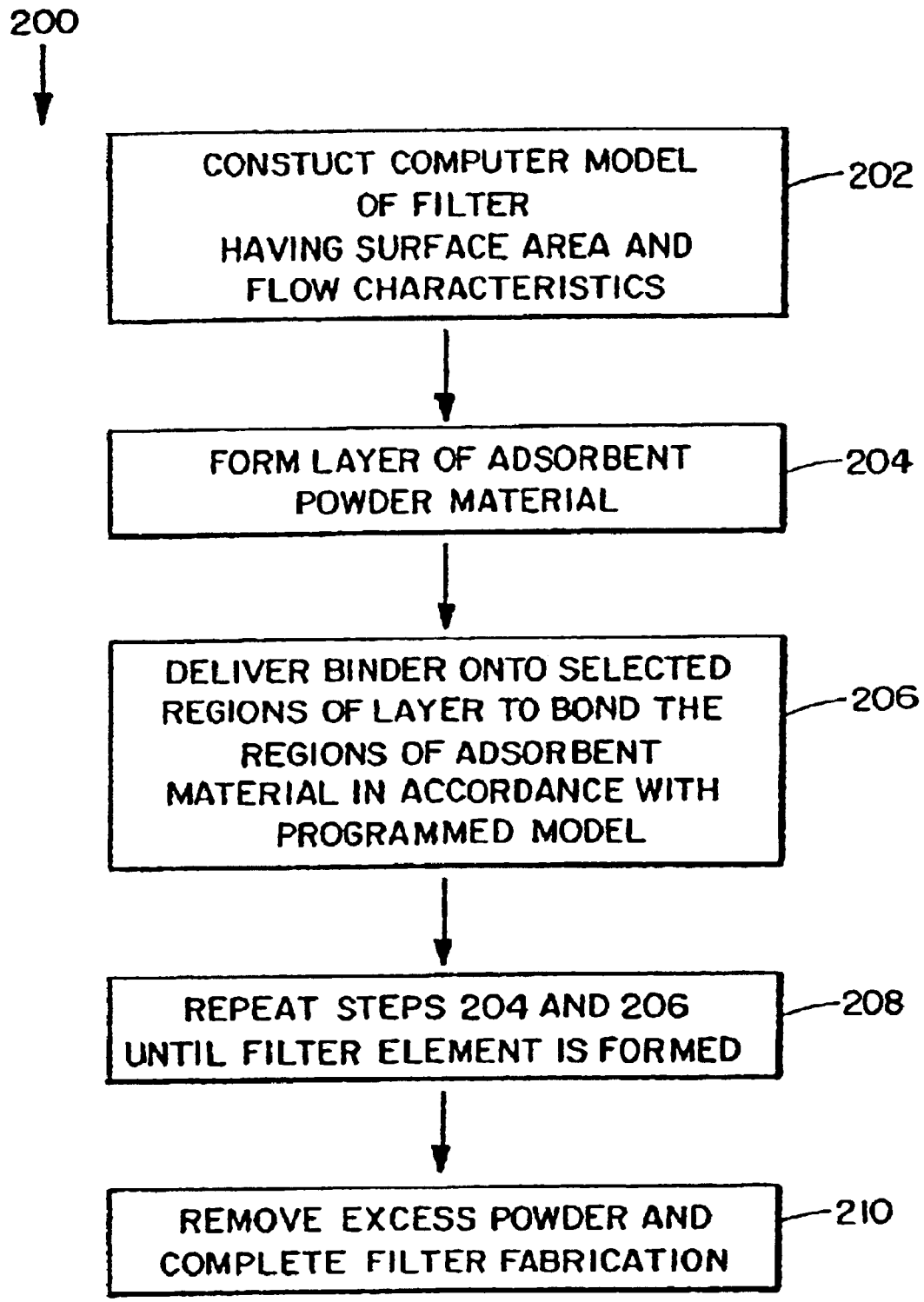
FIG. 11 is a flow chart illustrating a process for fabricating a filter element.
Figure 12:
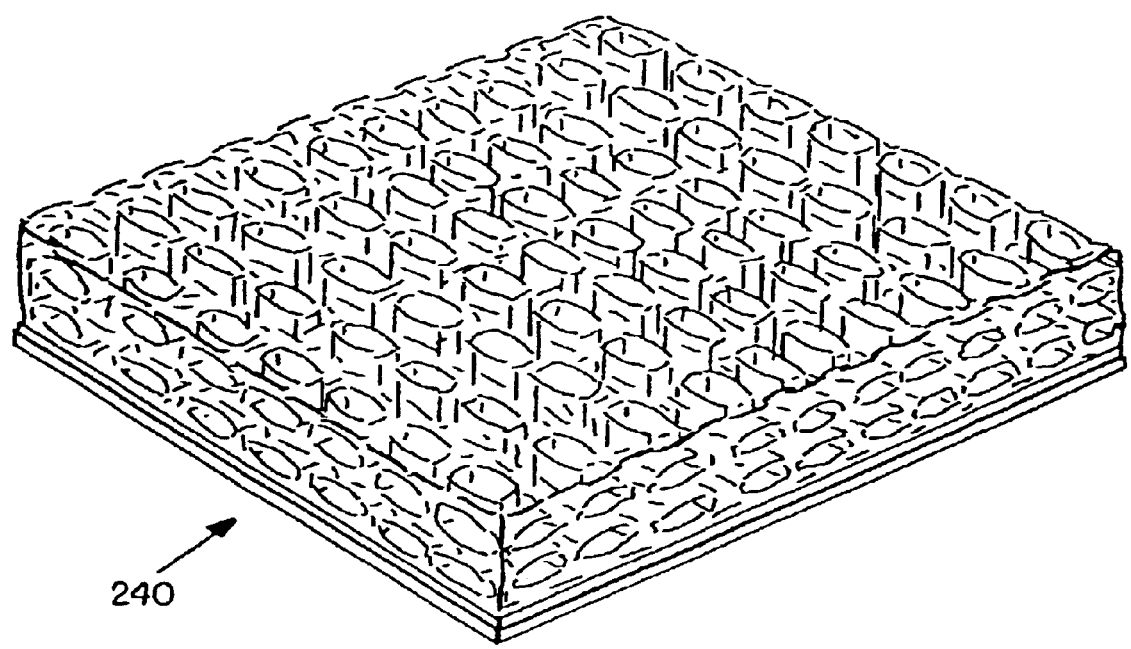
FIG. 12 illustrates an example of a three dimensional filter element fabricated in accordance with the process illustrated in FIG. 11.

Such a method of fabrication of a filter element is illustrated in connection with FIG. 11. The process 200 includes forming a three-dimensional model 202 of the filter element such that the dimensions are well defined. The first layer of the powder material used to form the filter is placed 204 by the printer apparatus. A binder is then delivered 206 onto the powder material resulting in the binding of selected regions thereof. Steps 204 and 206 are repeated a number of times 208 until the high-surface-area filter is formed. Finally, the excess material is removed 210. An illustrative example of a high surface area filter made in accordance with this method is shown in the example 240 of FIG. 12. The binder can be an acid-polymerizable or acid-cross-linkable liquid.

The relative thicknesses of the chemisorptive filter element 16 and the physisorptive filter element 32 can be engineered so that the useful life of the two filter elements will be exhausted at approximately the same time in a given environment. Accordingly, a chemisorptive filter element formed of sulfonated polymer can be made thinner than a physisorptive filter element formed of untreated carbon since the physisorptive properties of the carbon will typically be exhausted more quickly than the chemisorptive properties of the acidic, sulfonated polymer.

The two composite filter components 16 and 32, can be contained within any suitable container(s) or framework(s) for installation in an airflow path of a filtering apparatus coupled with a photolithography tool, the filter components 16 and 32 typically being in the form of removable or replaceable filter elements. For many purposes, it is preferable to increase the surface area of the filter material exposed to an incident air flow; and, for this purpose, the composite filter elements can be pleated to provide the increased surface area.

Figure 13:
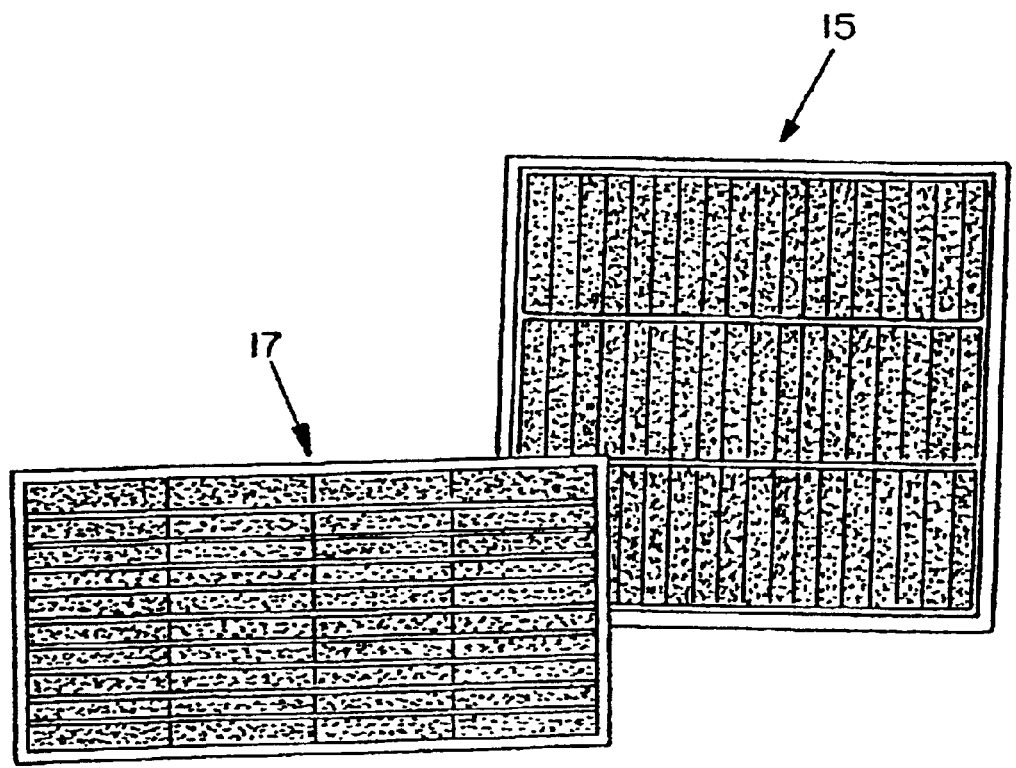
FIG. 13 is a perspective view of a filter element in a square or rectangular containment structure showing the creases of the pleated structure.
Figure 14:
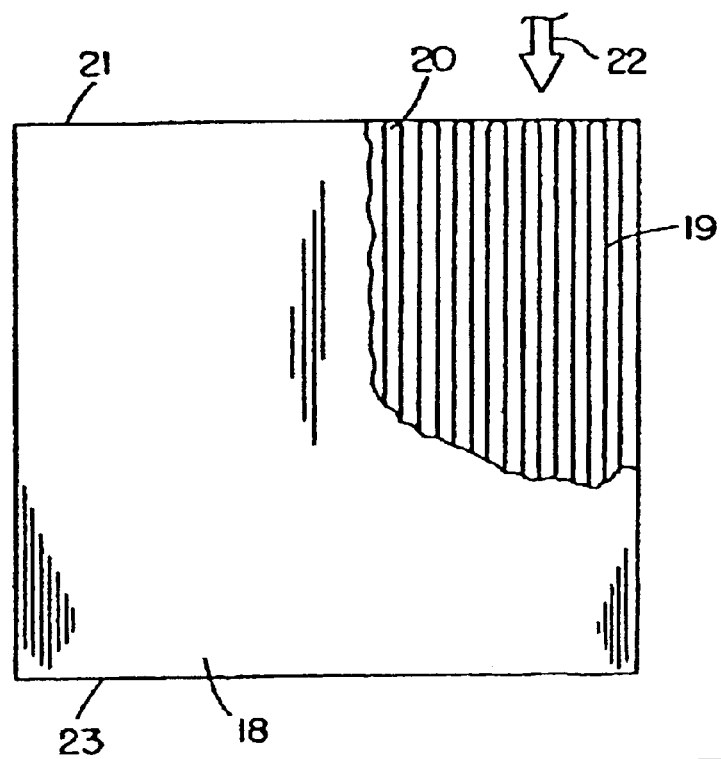
FIG. 14 is a top view of a filter element showing its pleated structure.

One embodiment is shown in FIG. 13, in which a composite material forms an air filter element 15 or 17. The filter material is pleated into an accordion-like structure 19, as shown in FIG. 14, contained within a square or rectangular container 18, having a front 21 and back 23, that are open to an air stream shown by arrow 22. The pleating 20 is substantially perpendicular to the air flow. FIG. 9 shows the structure in a front or back view. FIG. 14 shows a cutaway top view of a filter element.

Figure 15:
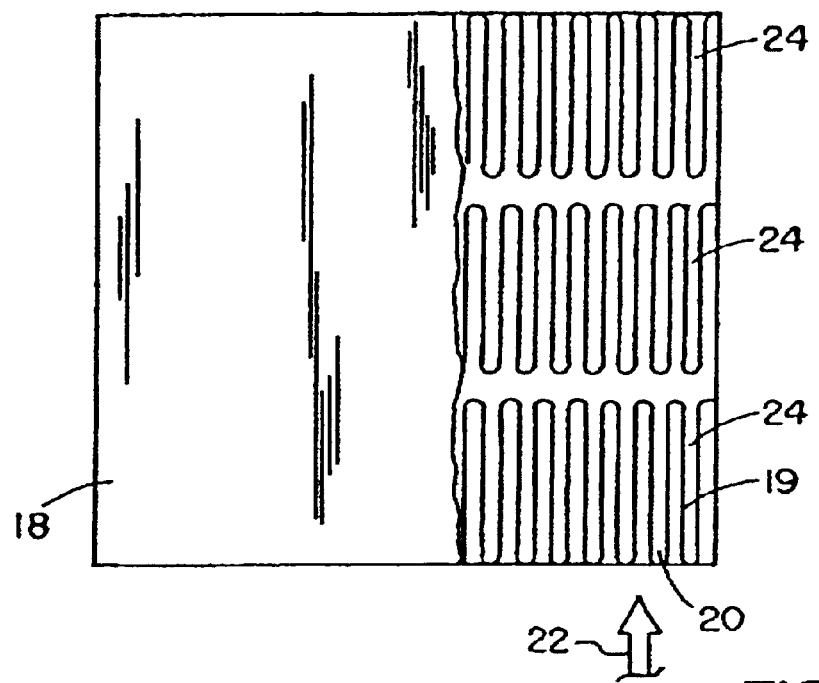
FIG. 15 is a top view of a filter element with a high first-pass-efficiency multi-pleat pack panel filter in a square or rectangular containment structure.

An alternative embodiment is shown in FIG. 15, wherein a plurality of pleated composite filter elements 24, are sequentially disposed within container 18, to provide a multi-stage filter through which the air can pass. As in the above embodiment, the pleats 20 of the elements 24 are substantially perpendicular to the direction of air flow 22.

Figure 16:
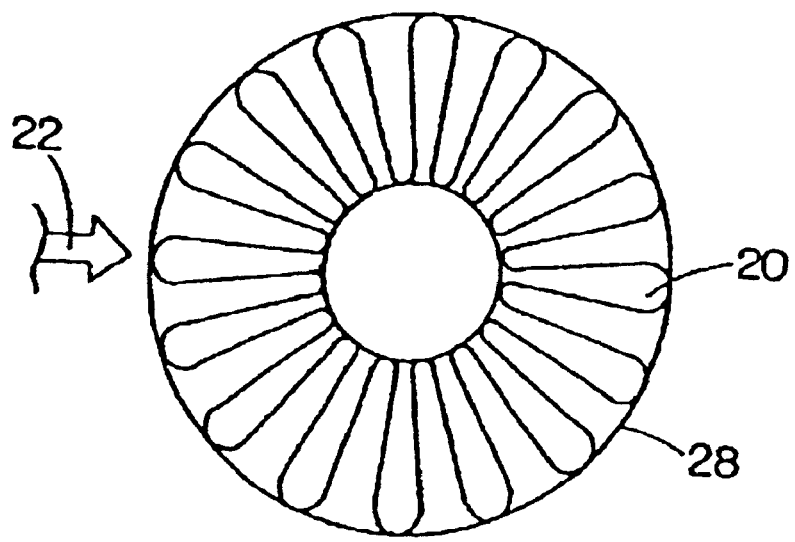
FIG. 16 is a top view of a filter element in a radially-pleated cylindrical containment structure.
Figure 17:
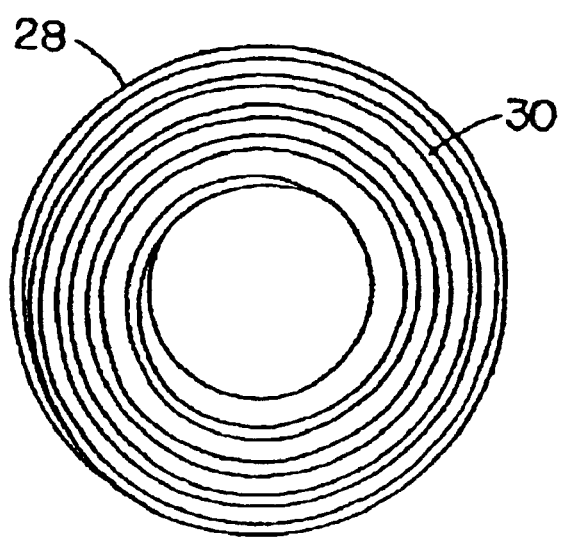
FIG. 17 is a top view of a filter element in a media-wrapped cylindrical filter.

A further embodiment is shown in FIG. 16, wherein a composite filter element is disposed in a cylindrical configuration and retained within a cylindrical container 28. The pleats 20 are, as described above, substantially perpendicular to a radially-directed air flow. A further embodiment is shown in FIG. 17, wherein the composite structure is wound in a spiral configuration 30 contained within a generally cylindrical container 28.

Acidic, chemisorptive particles can be evenly distributed throughout the non-woven or fiber matrix or polyester batting. An example of an acidic, chemisorptive particle includes but is not limited to sulfonated divinyl benzene styrene copolymer.

In one embodiment, the ion-exchange, strongly-acidic, preliminary catalyst has a particle size between 0.3 and 1.2 mm, a porosity of approximately 0.30 ml/g, and an average pore diameter of about 250 angstroms. The catalyst can have a higher porosity of up to 300 ml/g, or higher. In addition, the concentration of acid sites in the catalyst can be approximately 1.8 meq/ml and the surface area of the catalyst can be about 45 $m^2/g$. Such catalysts are sold under the trade name, AMBERLYST® 15DRY or AMBERLYST® 35DRY, by Rohm and Haas. Catalysts with physical properties outside the ranges described above can also be used.

Overall, the dry processing of the fiber matrix of the chemisorptive filter element involves the combination of sulfonated-divinyl-benzene-styrene copolymers using a dry material dispensing system, the inherent stratification of the batting's density, and the even distribution of the sulfonated divinyl benzene styrene copolymer particles as well as stratification of the sulfonated divinyl benzene styrene copolymer particle size. These procedures allow for a fabric architecture having an increased bed depth at a very low pressure drop, which is highly desirable due to the chemisorptive filter element's high first-pass efficiency coupled with its low operating cost.

The term, "efficiency," as employed herein is defined by the formula X-Y/X wherein X is the upstream concentration of pollutant, and Y is the downstream concentration of pollutant.

The filter can have a mix of an activated carbon and the preliminary catalyst material discussed above. This combination has sufficient porosity and strongly acidic groups to provide easy permanent removal of medium and strong bases and sufficient retention of weak bases from the airborne base contaminants. The filter can also include a porous polymer material.

The filter, as described, is employed in filtering the air in environments such as semiconductor fabrication systems where there is a requirement for uncontaminated air of high quality.

Figure 18:
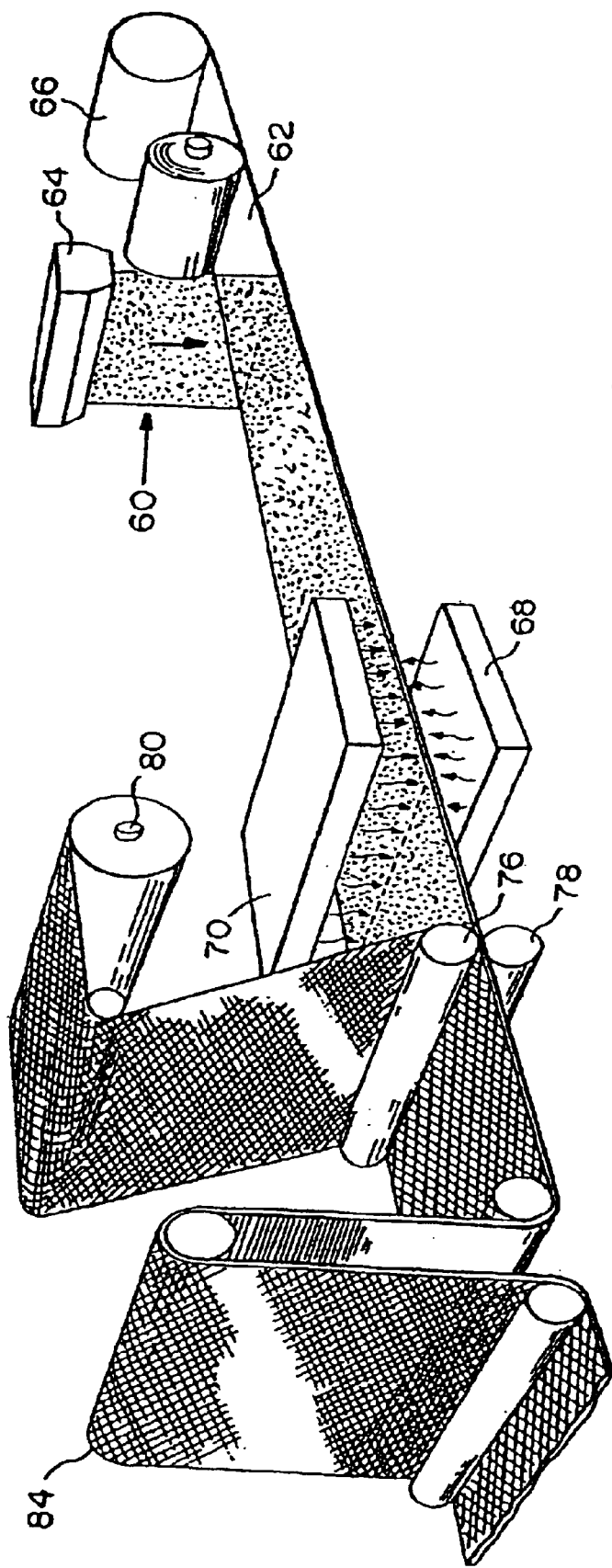
FIG. 18 is a perspective view of a process of producing a filter element.

Referring to FIG. 18, the middle air-laid polyester nonwoven lay 62 is collated to a cover sheet 66. The acidic, adsorbent particles 60 are positioned on a fiber matrix 62 from a fluidized bed or other particle distribution system 64. The sulfonated divinyl benzene styrene copolymer particles 60 are evenly stratified throughout the depth of the batting 62. As discussed above, an increased bed depth of adsorbent particles distributed throughout the batting is highly desirable as it increases residence time, increases exposure of the chemisorptive particle surfaces, provides a low pressure drop, and substantially increases the lifetime of the filter.

The chemisorptive particles 60 distributed in the matrix 62 are then heated, preferably using two zones 68, 70 of infrared energy at different wavelengths. The batting 62 is heated to an overall average temperature of between 250° and 350° F.

The infrared energy causes the chemisorptive particles to adhere to the batting at points where the particles contact the batting. This procedure avoids the necessity of raising the temperature of the entire batting to a point at, or near, the melting point of the polyester batting, which could cause the batting to melt and collapse thereby encasing the particles and destroying their chemical activity.

The batting 62 is then calendered using a pair of calender rolls 76, 78. The first of these rolls 76 can be temperature controlled, which allows the heating and calendering steps to be carried out at a steady temperature of around 140° F., and prevents overheating and subsequent melting of cover sheet and prevents over calendering of the fabric. The second roll, roll 78, may be a rubber roll having a durometer that avoids crushing of the adsorbent particles; roll 78 may also be metal.

Furthermore, when the temperature-controlled roller 76 is used, the pressure at which the batting is about 2000 pounds across the 26-inch distance. Higher calendering pressures can crush the particles particularly when those particles are activated-carbon based, thereby forming dust, which cannot be retained in the composite filter element and can consequently pass into the gas stream.

In addition, a synthetic non-woven cover sheet 80 that helps to maintain the sulfonated divinyl benzene styrene copolymer in the batting can be calendered with the batting 62, as discussed above. After the filter element is formed, gussets or spacers are placed in the filter element. The filter element is sealed into a box.

Optionally, the material may be conducted over an upper roller 84 to facilitate cooling the material prior to further processing. The method of manufacture for an activated carbon filter element is described in detail in U.S. Pat. No. 5,582,865, titled, "Non-Woven Filter Composite." The entire contents of this patent are incorporated herein by reference.

While the above-described method is one method of creating the filter, it is recognized that other techniques can be used. Some of these techniques include those developed by Hoechst such as that described in U.S. Pat. No. 5,605,746, the entire contents of which are incorporated herein by reference or KX Industries' method of media formation. The common feature in all of these methods is the incorporation of a chemically-active sorbent into a porous media structure.

In another method, a filter element can be made by premixing the chemisorptive media and the physisorptive media together and then depositing the mixture onto a web. Or the chemisorptive media and the physisorptive media can be deposited from a respective dispensing unit in desired proportions onto the web in situ as the web passes beneath the dispensing units.

Figure 19:
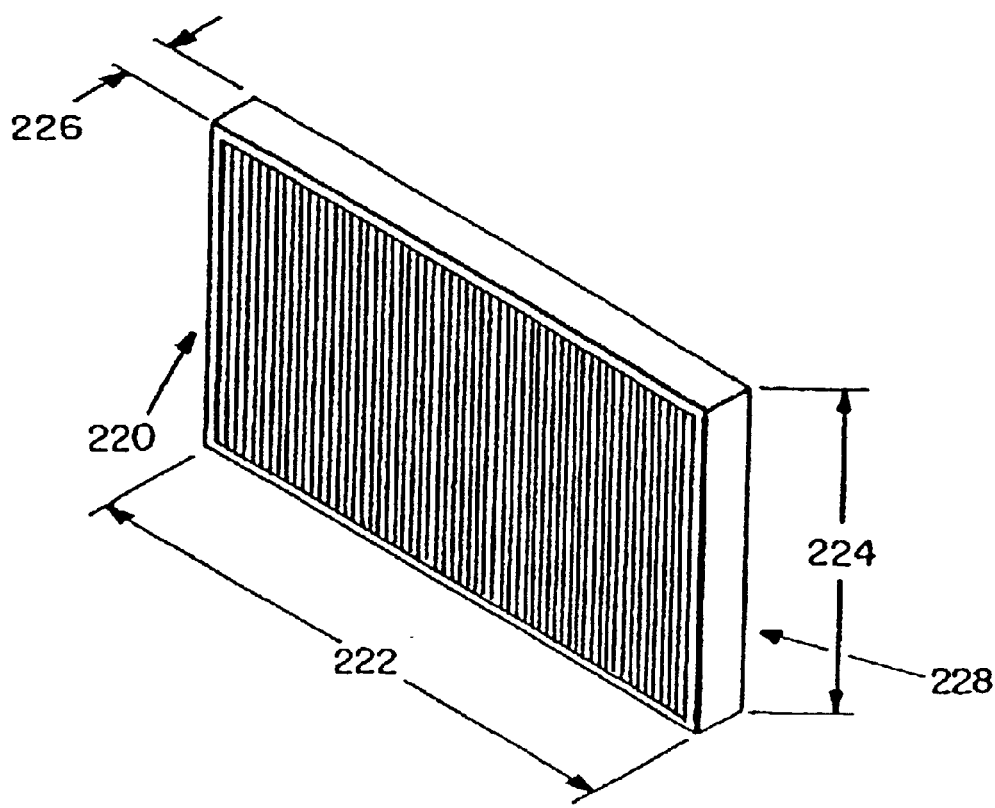
FIG. 19 is a pleated filter element.

A pleated filter structure 220 using the porous acidic polymer of the present invention is illustrated in FIG. 19. This is a pleated system-open on both sides of a rectangular frame 228 with a length 222, width 224 and depth 226 such that it can be used as a replacement filter in stack filter systems. The filter has a removal efficiency of over 99% at 1000 ppb challenge concentration.

Figure 20:
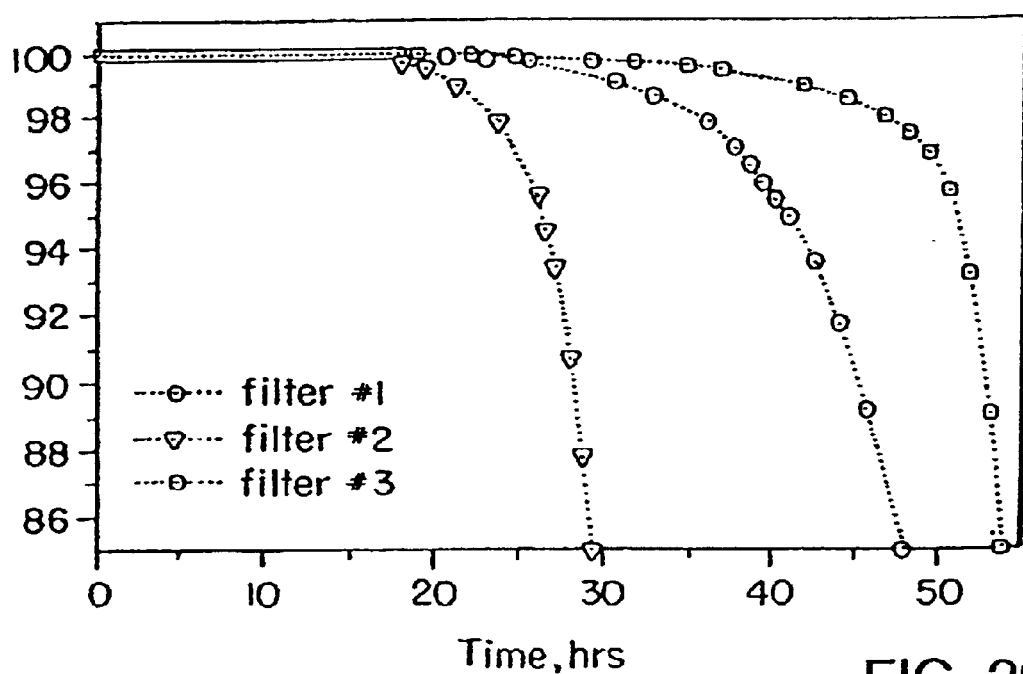
FIG. 20 is a graphical illustration comprising the base removal efficiency of filters previously available and of an acidic, adsorbent filter element of this invention.

FIG. 20 graphically illustrates the removal efficiency for three different acidic, chemisorptive filter elements. The graphs represent removal efficiency as a function of time at 20 ppm of $NH_3$ concentration upstream from the filter. Filter element size is approximately 12 in.×12 in.×6 in. Air flow is approximately 100 cubic feet per minute (cfm). Considering service life data only, it appears that filter element #3 performed best. However, if additional data is considered, the conclusion is not so simple. The pressure drop for filter element #1 was 0.2" water column (WC); the pressure drop for filter element #2 was 0.3"WC; and the pressure drop for filter element #3 was 1.0"WC. Filter elements #1 and #2 are very close to tool manufacturer's specifications, but filter element #3 creates an excessive pressure drop that interferes with the tool's proper ECU functioning. Excessive pressure drop is undesirable for multiple reasons. For example, it increases fan load and power consumption, reduces airflow through the tool and positive pressure inside the enclosure Thus, filter element #1 made in accordance with the present invention provided a substantial improvement in service life while providing a pressure drop that is compatible with tool operation.

Figure 21:
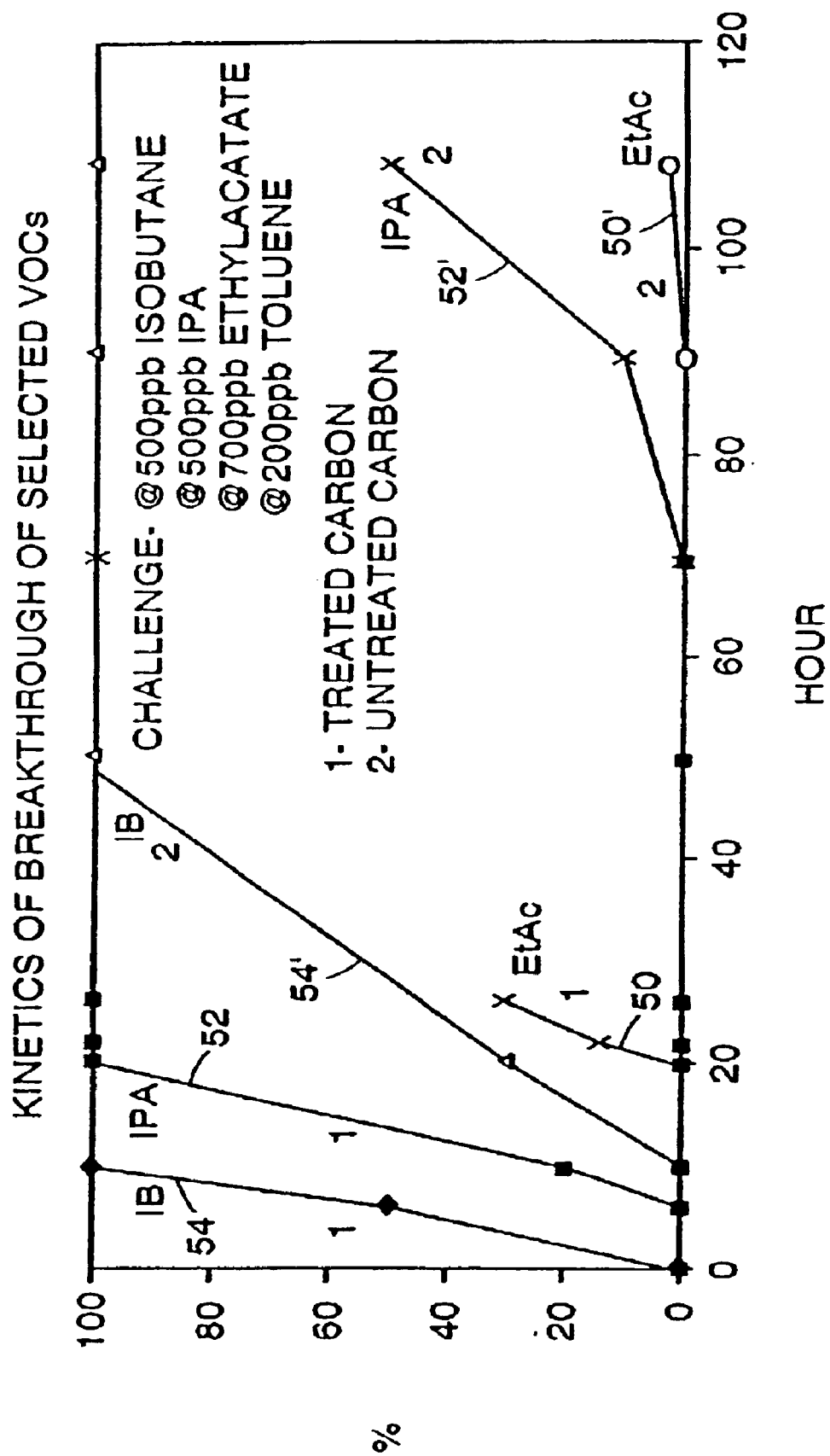
FIG. 21 is a graph illustrating comparative vapor breakthrough rates with treated and untreated, activated carbon filters.

The adsorptive performance of an untreated, activated-carbon filter element is illustrated in FIG. 21. The graph of FIG. 21 shows the adsorption breakthrough curves for a number of organic compounds on both treated and untreated carbons. Comparing the breakthrough curve for ethyl acetate (EtAc) for treated 50 and untreated carbon 50', the capacity (time to equivalent breakthrough) of untreated carbon is found to be between 5 and 10 times higher than that of treated carbon. As shown in the graph, organic vapor capacity for isopropyl alcohol 52 and isobutane 54 in treated carbon is similarly small in comparison to corresponding measurements of organic vapor capacity for isopropyl alcohol 52' and isobutane 54' in untreated carbon.

The above-described filter elements have a removal efficiency over 99% for both volatile base compounds and condensable organic contamination. The capacity of these filter elements for both volatile base compounds and condensable organics has a range between 5 to 60 ppm-days. The removal efficiency for non-condensable organic contaminants is greater than 90%, and that for element organics is over 99%. Typical element organics include Si—R, P—R, B—R, $Sn(Bi)_3$ and other organo-metallics, where R is an organic group, Si is silicon, P is phosphorous, B is boron, Sn is tin, and Bi is bismuth.

Figure 22:
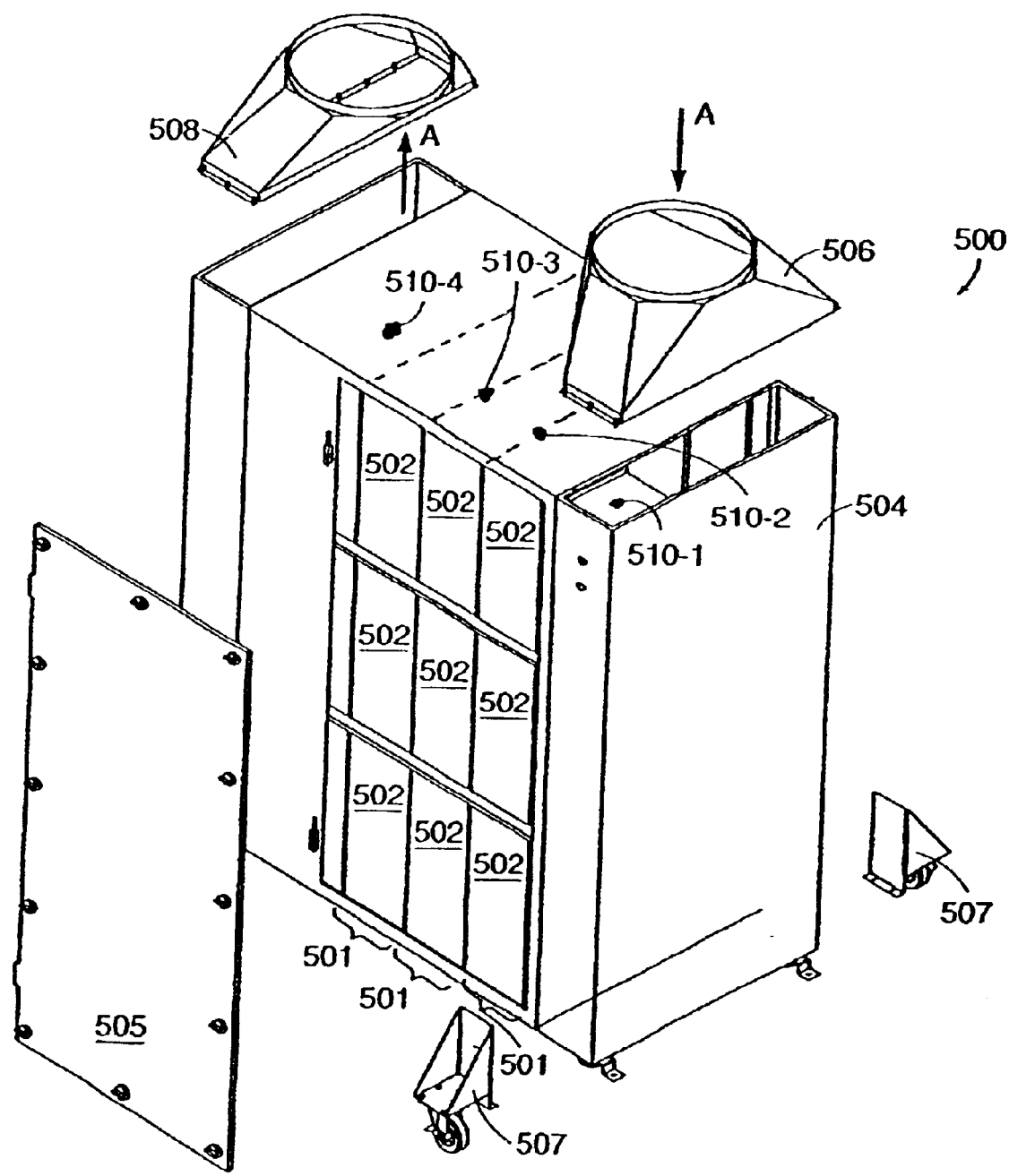
FIG. 22 is a filter unit in accordance with the invention.

Illustrated in FIG. 22 is an embodiment of the invention as a filter unit 500 including a multiplicity of filter elements 502 having both chemisorptive and physisorptive media. As can be seen in FIG. 22, the filter elements 502 are arranged in parallel in a set of stacks 501 which are arranged in series within a casing 504 of the filter unit 550. A removable cover panel 505 allows access to the filter elements 502. The filter unit 500 is also provide with a set of casters 507 which facilitate easily moving the filter unit 500 to a desired location. Air filtering systems are described in greater detail in U.S. Pat. No. 5,607,647, the entire contents of which are incorporated herein by reference.

In operation, air flows in the direction of arrow A through an intake port 506, through the filter elements 502, and out of an outlet port 508. A set of sampling ports 510-1, 510-2, 510-3, and 510-4 (collectively referred to as sampling port 510) provide access to several regions of the filter unit 500 to facilitate monitoring the quality of the air as it passes through the filter unit 500. There is a sampling port on each side of the individual filter elements 502 so that the change in the quality of the air as it goes through the filter element can be evaluated.

Figure 23:
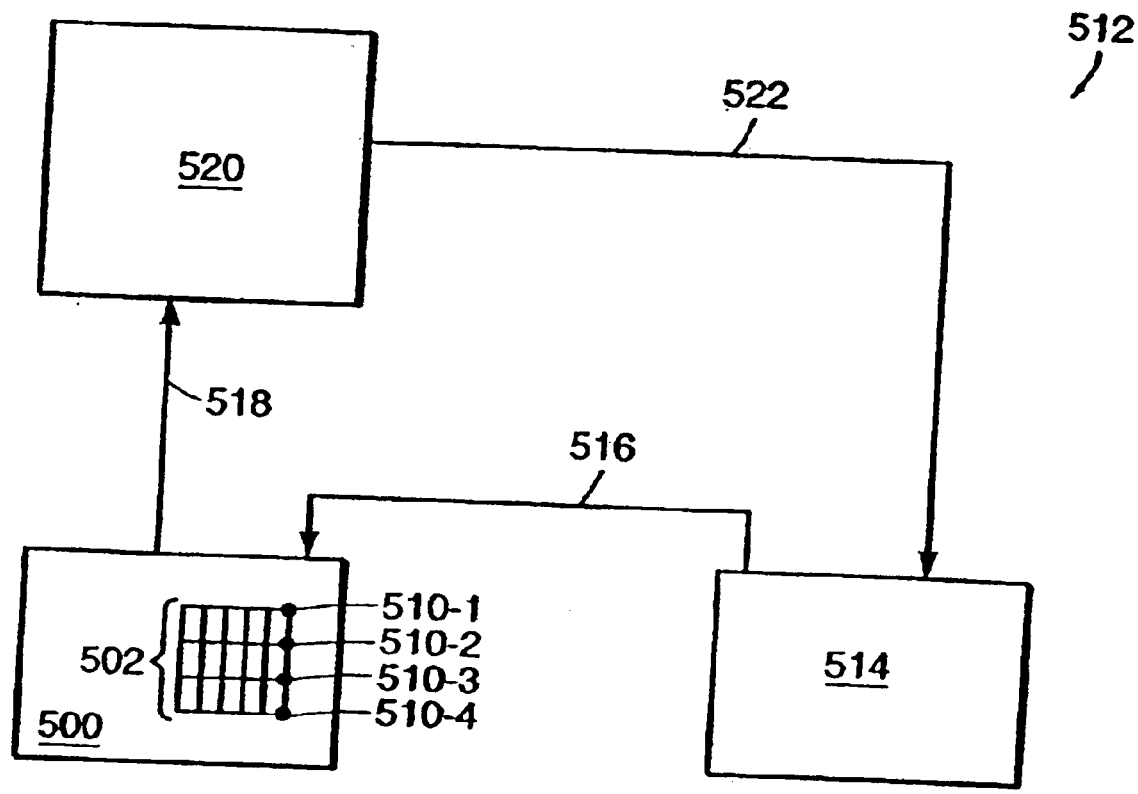
FIG. 23 is a schematic illustration of the filter unit of FIG. 22 as a component of a photolithography system.

Referring now to FIG. 23, there is shown the filter unit 500 employed in part of a photolithography process 512. The filter unit 500 is connected to an air handler unit 514 with a line 516. Another line 518 connects filter unit 500 to a tool 520, such as a stepper or track, and a line 522 connects the tool 520 to the air handler 514. Thus the air handler 514 sends unfiltered air to the filter unit 500 through the line 516. Contaminants in the air are then removed as the air flows through the filter elements 502 of the filter unit 500. The filtered air is subsequently sent to the tool 520 through the line 518. And after the air passes through the tool 520, it returns via the line 522 back to the air handler 514.

The performance of the filter elements 502 can be monitored by visually inspecting the semiconductor wafers. For example, an operator can look at the wafer to determine if the lithographic process has degraded. Such degradation provides an indirect indication to the operator that the performance of the filters have degraded.

Figure 24A:
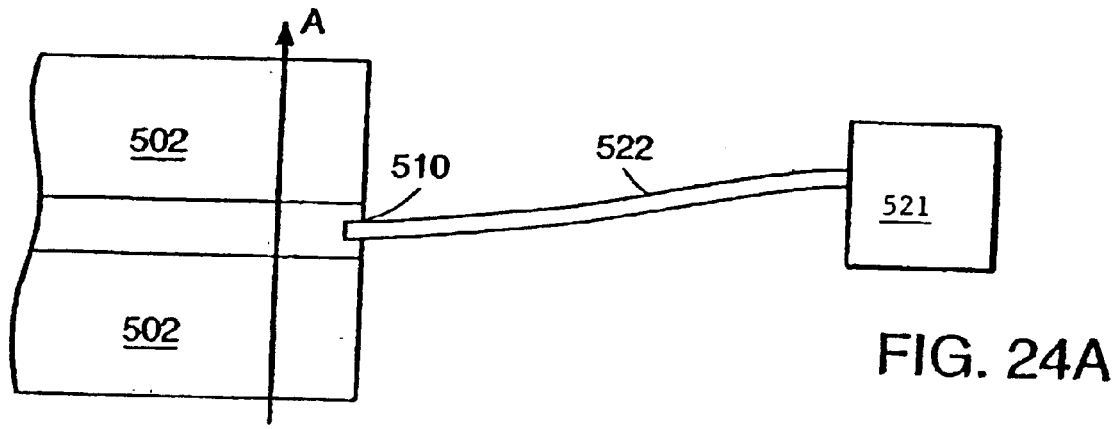
FIG. 24A is a close-up view of a sampling port of the filter unit of FIG. 22 connected to an analytical device.

Alternatively, the performance of the filter elements 502 is monitored by taking samples from the sample ports 510. For example, as illustrated in FIG. 24A, as air flows in the direction of the arrow A through the filter elements 502, the contaminants in the air in the region between the two filter elements 502 is determined with an analytical device 521 which draws samples from the sampling port 510 through a line 522. Typical analytical devices include gas chromatograph mass selective (GCMS), ion mobility spectrometers, surface acoustic wave, atomic absorption, inductance couple plasma, and Fourier transform (FTIR) methods. Sampling from all the ports 510-1 through 510-4 (FIG. 23), enables determining the amount of contaminants in the air before and after the air goes through each of the filter elements, thereby providing a convenient method for monitoring the performance of all the filter elements 502 of the filter unit 500.

Figure 25:
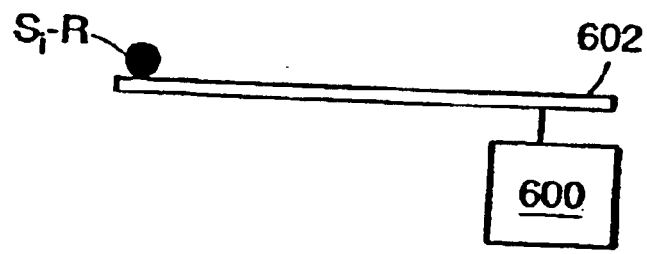
FIG. 25 is a schematic illustration of a sacrificial lens used to monitor the filters.

Surface acoustic wave detectors are further described in U.S. Pat. No. 5,856,198, which is hereby incorporated by reference in its entirety. Referring to FIG. 25, there is shown an acoustic wave detector 600 used in combination with a sacrificial lens 602 to detect the presence of element organic such as Si—R. The Si—R molecule is volatile; however, upon exposure to UV radiation, Si—R reacts according to the reaction $$Si\text{—}R \rightarrow Si\text{—}R^o + R^o$$

where $R^o$ is an organic free radical, and oxygen, $O_2$, reacts as $$O_2 \rightarrow 2O^o$$

such that $$Si\text{—}R^o + O^o \rightarrow Si\text{—}R\text{—}O \text{ or } R\text{—}Si\text{—}O$$

Repeating the above reactions n-times provides $$Si\text{—}R + O_2 \rightarrow Si\text{—}O_2 + R + R\text{—}O + \ldots$$

thereby producing Si—$O_2$, which is a non-volatile inorganic oxide that is condensable on the sacrificial lens 602. Therefore, by exposing the Si—R to UV radiation, the acoustic wave detector 600 is able to detect the amount of Si—R in the sampled air.

Figure 24B:
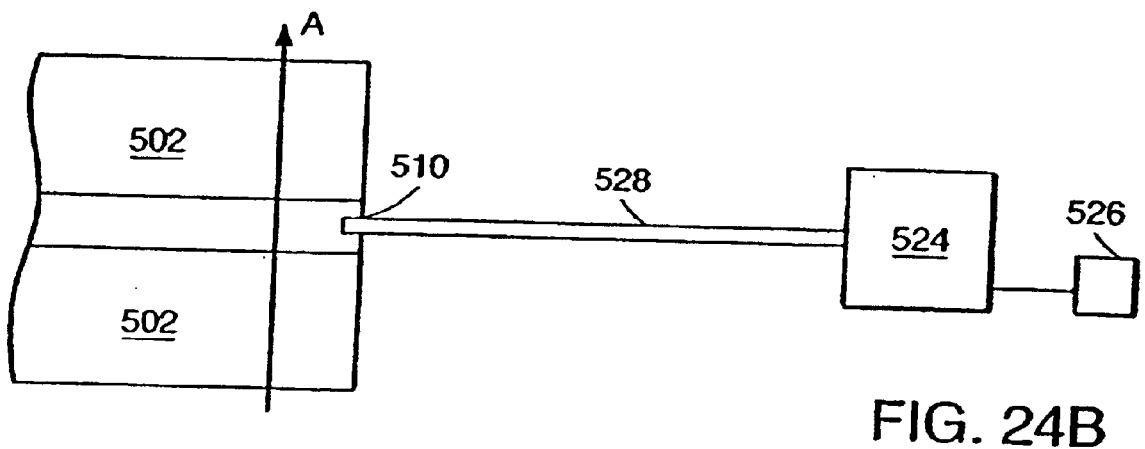
FIG. 24B is a close-up view of a sampling port of the filter unit of FIG. 22 connected to a concentrator.
Figure 24C:
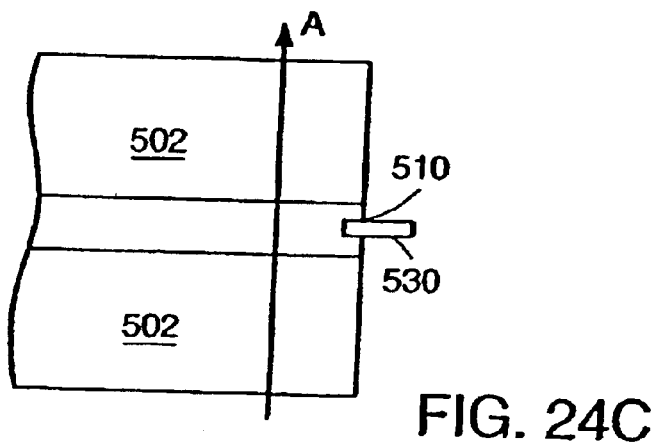
FIG. 24C is a close-up view of a passive sampler attached to a sampling port of the filter unit of FIG. 22.

Rather than connecting the sampling port to an analytical device, the sampling port 510 can be connected to a concentrator 524, as illustrated in FIG. 24B. A pump 526 coupled to the concentrator 524 draws the samples to the concentrator through a line 528. Alternatively, as illustrated in FIG. 24C, the sample accumulates by diffusion in a concentrator 530 attached directly to the sampling port 510. In either case, the operator takes the concentrator 524 or 530 back to the lab where the contents of the concentrator is evaluated by any of the analytical devices described above.

While this invention has been particularly shown and described with references to preferred embodiments thereof, it will be understood by those skilled in the art that various changes in form and details may be made therein without departing from the scope of the invention encompassed by the appended claims.

What is claimed:

1. A method of filtering air for a fabrication facility needing uncontaminated air of high quality, comprising the steps of:
    providing a chemisorptive filter element having a chemisorptive media including a porous divinyl benzene styrene copolymer having at least one of sulfonic acid and a carboxylic acid functional group that can react with a base contaminant;
    providing a physisorptive filter element having a physisorptive media that can physically adsorb a condensable contaminant;
    flowing air through the chemisorptive filter element and the physisorptive filter element.

2. The method of claim 1 wherein the physisorptive media is untreated, activated carbon.

3. The method of claim 1 further comprising the step of flowing the air into a photolithography tool after passing the air through the filter elements.

4. A method for filtering air circulated through a photolithography tool, comprising the steps of:
    passing air through physisorptive filter media;
    cooling the air at or before the physisorptive filter media with a cooling element;
    after the air exits the physisorptive filter media, heating the air with a heating element;
    after heating the air, passing the air through chemisorptive filter media; and
    after the air exits the chemisorptive filter media, delivering the air to a photolithography tool.

5. The method of claim 4, wherein the heating element is governed to heat the air to a temperature between about 21° and about 23° C.

6. A method of filtering air through a filter unit, comprising the steps of:
    passing the air through a multiplicity of filter elements made of physisorptive media and chemisorptive media; and
    monitoring the performance of the multiplicity of filter elements by sampling the air in the region between adjacent filter elements.

7. The method of 6, wherein the step of monitoring includes sampling the air in a region upstream of the multiplicity of filter elements and in a region downstream of the multiplicity of filter elements.

8. A method of filtering air circulated through a photolithography tool, comprising the steps of:

delivering air to a filter unit having a multiplicity of filter elements made of physisorptive media and chemisorptive media;

after the air exits the filter unit, delivering the air to the photolithography tool; and monitoring the performance of the filter elements by sampling the air within the filter unit in the regions between adjacent filter elements.

9. The method of claim 8, wherein the step of monitoring includes sampling the air within the filter unit in a region upstream of the multiplicity of filter elements and in a region downstream of the multiplicity of filter elements.

10. A method of filtering air for a fabrication facility needing uncontaminated air of high quality, comprising the steps of:

providing a chemisorptive media including a copolymer having an acidic functional group that can react with a base contaminant;

providing a physisorptive media intermixed with the chemisorptive media that can physically adsorb a condensable contaminant;

flowing air through the chemisorptive media and the physisorptive media.

11. The method of claim 10 wherein the chemisorptive media includes a porous divinyl benzene styrene copolymer having a sulfonic acid group.

12. The method of claim 10 wherein the physisorptive media is untreated, activated carbon.

13. The method of claim 10 further comprising the step of flowing the air into a photolithography tool after passing the air through the media.

14. A method of filtering air for a fabrication facility needing uncontaminated air of high quality, comprising the steps of:

providing a pleated chemisorptive filter element having a chemisorptive media including a copolymer having an acidic functional group that can react with a base contaminant;

providing a pleated physisorptive filter element having a physisorptive media that can physically adsorb a condensable contaminant;

flowing air through the chemisorptive filter element and the physisorptive filter element.

15. The method of claim 14 wherein the chemisorptive media includes a porous divinyl benzene styrene copolymer having a sulfonic acid group.

16. The method of claim 14 wherein the physisorptive media is untreated, activated carbon.

17. The method of claim 14 further comprising the step of flowing the air into a photolithography tool after passing the air through the pleated filter elements.

18. The method of claim 6, wherein the chemisorptive media comprises a porous divinyl benzene styrene copolymer having at least one of a sulfonic acid and carboxylic acid functional group.

19. The method of claim 6, wherein at least one of the multiplicity of filter elements comprises physisorptive media intermixed with chemisorptive media.

20. The method of claim 6, wherein at least one of the multiplicity of filter elements is a pleated filter element.

* * * * *